United States Patent
Boitard et al.

(10) Patent No.: US 10,045,024 B2
(45) Date of Patent: Aug. 7, 2018

(54) METHOD AND DEVICE FOR QUANTISING THE FLOATING VALUE OF A PIXEL IN AN IMAGE

(71) Applicant: THOMSON LICENSING, Issy les Moulineaux (FR)

(72) Inventors: Ronan Boitard, Belz (FR); Dominique Thoreau, Cesson Sévigné (FR); Kadi Bouatouch, Rennes (FR); Remi Cozot, Rennes (FR); Catherine Serre, Saint Gregoire (FR)

(73) Assignee: THOMSON LICENSING, Issy les Moulineaux (FR)

( * ) Notice: Subject to any disclaimer, the term of this patent is extended or adjusted under 35 U.S.C. 154(b) by 137 days.

(21) Appl. No.: 15/038,769

(22) PCT Filed: Nov. 25, 2014

(86) PCT No.: PCT/EP2014/075482
§ 371 (c)(1),
(2) Date: May 24, 2016

(87) PCT Pub. No.: WO2015/078843
PCT Pub. Date: Jun. 4, 2015

(65) Prior Publication Data
US 2017/0006288 A1      Jan. 5, 2017

(30) Foreign Application Priority Data

Nov. 27, 2013   (FR) ..................... 13 61697
Jun. 25, 2014   (FR) ..................... 14 55872

(51) Int. Cl.
*H04N 11/02*       (2006.01)
*H04N 19/124*      (2014.01)
(Continued)

(52) U.S. Cl.
CPC .......... *H04N 19/124* (2014.11); *G06T 5/002* (2013.01); *G06T 5/007* (2013.01); *H04N 19/157* (2014.11);
(Continued)

(58) Field of Classification Search
CPC ................................................ H04N 19/124
(Continued)

(56) References Cited

U.S. PATENT DOCUMENTS 5,329,475 A      7/1994   Juri et al.
6,160,919 A  *  12/2000   Hale ..................... G06T 9/007
                                                      382/250
(Continued)

FOREIGN PATENT DOCUMENTS

EP       0671816       9/1995
EP       2007131      12/2008
EP       2445214       4/2012

OTHER PUBLICATIONS

Le Dauphin et al., "Prediction-Guided Quantization for Video Tone Mapping", Proceedings of International Society for Optical Engineering, vol. 9217, Sep. 23, 2014, pp. 1-9.
(Continued)

*Primary Examiner* — Leron Beck
(74) *Attorney, Agent, or Firm* — Brian J. Dorini; Patricia A. Verlangieri (57) ABSTRACT

The invention relates to a method and device for quantising the floating value of a pixel of an image by rounding either to a lesser whole number, to a greater whole number, or to the whole number closest to this floating value. The method is characterised in that the selection of rounding this floating value is determined based on a test value.

13 Claims, 3 Drawing Sheets

(51) Int. Cl.
  G06T 5/00      (2006.01)
  H04N 19/176    (2014.01)
  H04N 19/61     (2014.01)
  H04N 19/157    (2014.01)

(52) U.S. Cl.
  CPC ........... *H04N 19/176* (2014.11); *H04N 19/61* (2014.11); *G06T 2207/10016* (2013.01); *G06T 2207/20182* (2013.01); *G06T 2207/20208* (2013.01)

(58) Field of Classification Search
  USPC .................................................. 375/240.12
  See application file for complete search history.

(56) References Cited

U.S. PATENT DOCUMENTS

| | | | |
|---|---|---|---|
| 6,909,812 | B1 | 6/2005 | Faryar et al. |
| 8,417,045 | B2 | 4/2013 | Hinds |
| 9,076,224 | B1* | 7/2015 | Shah .................. G06T 5/009 |
| 2010/0053200 | A1 | 3/2010 | Correa et al. |
| 2013/0329795 | A1 | 12/2013 | Tourapis et al. |
| 2017/0006288 | A1* | 1/2017 | Boitard .................. G06T 5/002 |

OTHER PUBLICATIONS

Koz et al., "A comparative survey on high dynamic range video compression", Proceedings of SPIE, Applications of Digital Image Processing XXXV, vol. 8499, Oct. 15, 2012, pp. 1-16.

Reinhard et al., "Photographic Tone Reproduction for Digital Images", ACM Transactions on Graphics, Proceedings of ACM Special Interest Group on Computer Graphics and Interactive Techniques, vol. 21, No. 3, Jul. 2002, pp. 267-276.

Kang et al., "High Dynamic Range Video", ACM Special Interest Group on Computer Graphics and Interactive Techniques, San Diego, California, USA, Jul. 27, 2003, pp. 1-7.

Mantiuk et al., "Display Adaptive Tone Mapping", ACM Transactions on Graphics, vol. 27, No. 1, Aug. 2008, pp. 1-10.

Wang et al., "An Improved Floating-to-Fixed-Point Conversion Scheme for DCT Quantization Algorithm", Journal of Signal Processing Systems, vol. 66, No. 2, Feb. 2012, pp. 135-139.

Myszkowski et al., "High Dynamic Range Video", Synthesis Lectures on Computer Graphics and Animation, Lecture #5, Morgan & Claypool Publishers, San Rafael, 2008, pp. 1-154.

Ramsey et al., "Adaptive Temporal Tone Mapping", Proceeding of the Seventh IASTED International Conference on Computer Graphics and Imaging, Kauai, Hawaii, US, Aug. 17, 2004, pp. 124-128.

Boitard et al., "Temporal Coherency for Video Tone Mapping", Proceedings of SPIE, Applications of Digital Image Processing XXXV, vol. 8499, Oct. 15, 2012, pp. 1-10.

Ozkan et al., "Efficient Multiframe Wiener Restoration of Blurred and Noisy Image Sequences", IEEE Transactions on Image Processing, vol. 1, No. 4, Oct. 1992, pp. 453-476.

Dekker et al., "The contour plot method for noise reduction in digital video", Acta Electronica, vol. 27, No. 1-2, (1985), pp. 119-131.

* cited by examiner

METHOD AND DEVICE FOR QUANTISING THE FLOATING VALUE OF A PIXEL IN AN IMAGE

This application claims the benefit, under 35 U.S.C. § 365 of International Application PCT/EP14/075482, filed Nov. 25, 2014, which was published in accordance with PCT Article 21(2) on Jun. 4, 2015 in English and which claims the benefit of French patent application 1361697, filed Nov. 27, 2013 and of French patent application 1455872 filed Jun. 25, 2014.

1. FIELD OF THE INVENTION

The invention relates to the general field of quantising floating values and more specifically to a method and device for quantising the floating value of a pixel in an image.

Such a method or device may be used, for example, in a context of converting the dynamic range of an image or sequence of images, that is to say in a context where the dynamic range of an image or sequence of images is modified.

2. PRIOR ART

This section is intended to introduce various aspects of the prior art which may be linked to various aspects of the invention which are described and/or claimed below. This section is useful since it provides readers with basic information which will facilitate a better understanding of the various aspects of the invention. However, this information is to be used for this purpose only, and must in no way be considered as a summary of the prior art recognised by the inventor.

Historically, each component (luminance and chrominance) of an image is expressed over 8 bits, that is to say that the whole value of each pixel of each component is represented over 8 bits.

However, it may be necessary to manipulate images whose dynamic ranges are greater than 8 bits.

Use is therefore made of floating values to represent the values of the pixels of each component of the image. These floating values are defined, generally, by the following equation:

$$C_p = M \cdot 2^E \quad (1)$$

where $C_p$ is one of the R, G or B components of a pixel, with M and E representing mantissa and exponent respectively.

Representations such as RGBE (with E meaning exponent) or OpenEXR RGB half float (et K. Myszkowski, R Mantiuk, G Krawczyk "High Dynamic Range video," Synthesis Lectures on Computer Graphics and Animation, Morgan & Claypool Publishers 2008) comprise components which are coded with 5 bits of mantissa and 10 bits of exponent for the OpenEXR format and 8 bits of mantissa and 8 bits of exponent for the RGBE format.

Thus, more generally, the floating values of image pixels are expressed by:
 a mantissa comprising Nm bits which enables the mantissa values to extend between 0 and $2^{Nm}-1$, and
 an exponent of Ne bits which enables the exponent values to extend between 0 et $2^{Ne}-1$ Thus, the values expressed with a floating representation composed of 1 sign bit, Nm mantissa bits and Ne exponent bits can vary from 0 to $(2^{Nm}-1) \times 2^{(2^{Ne}-1)}$.

The floating values of image pixels can be obtained, for example, by capture, that is to say from one or more cameras. But these floating values can also be obtained by calculation. For example, consider the case of converting the dynamic range of an image sequence and admit that we want to reduce the dynamic range of this image sequence (such as expressed over 10 bits) to obtain an image sequence with a reduced dynamic range (such as expressed over 8 bits). To carry out this conversion, it is traditional to use a method that consists, first, of dividing the whole values of the pixels by a factor equal to $2^n$ (with n being the difference of bits used to express the dynamic ranges of the images, here n=2). The values resulting from these divisions are floating values because some original values of the pixels are not divisible by 4.

The floating values of a pixel of an image must be quantised, most often, before being used.

For this purpose, it is known to use quantisers that round the floating value of a pixel to the nearest whole value.

When such quantisation is applied to the floating values of pixels of multiple successive images in an image sequence, there sometimes appears to be quantisation temporal incoherencies, that is to say related to the rounding selection, which can be selected as rounded to the next whole number greater than a first floating value and then the whole value of a second floating value, while these two floating values are, in reality, very close to one another and therefore require being quantised in the same manner.

This problem is particularly disturbing in a context of converting a dynamic range of an image or image sequence, that is to say, typically in the case where the dynamic range of a component of an image must be reduced to be, for example, viewed on a screen.

This problem can also penalise the coding efficiency of a high dynamic image sequence (greater than 8 bits) by a current predictive coding system (8 bits) because like the dynamic range of the luminance components of the images in this image sequence must be reduced and then quantised prior to the coding of each image in this image sequence, temporal quantisation incoherencies may appear and then introduce an increase in the dynamic range of the residual prediction error and therefore a loss of coding efficiency.

3. SUMMARY OF THE INVENTION

The purpose of the invention is to overcome at least one of the disadvantages previously mentioned.

For this purpose, generally, a method for quantising the floating value of a pixel in an image by rounding to the whole number, to the greater whole number, or to the greatest whole number closest to this floating value, characterised in that the selection of rounding this floating value is determined based on a test value.

According to one embodiment, the rounding selection for this floating value is determined by comparing this floating value and this test value.

According to one embodiment, the test value is the value of a pixel that belongs in an image, called a test.

According to one embodiment, the test image is different than the image.

According to one embodiment, the pixel of the test image is determined from a displacement information element of the pixel from the image.

According to one embodiment, the image is a version of an image of an original image sequence whose dynamic range was reduced compared to that of the image in this original image sequence, and the test image is a version of an image from this original image sequence whose dynamic range was also reduced and whose floating values of the pixels were further quantised.

According to one embodiment, the floating value of the pixel of the image is converted to extend within the range of compatible values with that of the values of the pixels of the test image.

According to one embodiment, in which the rounding selection for the floating value is determined from the difference between this floating value and the test value.

According to one embodiment, the quantisation is determined by rounding the floating value to the greater whole value if the difference is less than or equal to a threshold, and otherwise to the lesser whole number.

According to one embodiment, the quantisation is determined by rounding the floating value to the greater whole number if the difference is less than 0 but greater than a negative threshold, to the lesser whole value if the difference is greater than 0 but less than a positive threshold, and rounding the floating value of the pixel to the nearest whole number if the floating value is less than or equal to the negative threshold and greater than or equal to the positive threshold.

According to one embodiment, the quantisation is determined from a first, second, third, fourth, fifth, and sixth thresholds whose values are increasing, the first, second, and third thresholds being negative values and the fourth, fifth, and sixth thresholds being positive values:
  by rounding the floating value of a pixel of the image to the greater whole number:
    if the difference is strictly greater than the first threshold and less than or equal to the second threshold; or
    if the difference is negative or equal to 0 and strictly greater than the third threshold;
  by rounding the floating value of a pixel of the image to the lesser whole number:
    if the difference is strictly positive and strictly less than the fourth threshold; or
    if the difference is greater than or equal to 0 or equal to the fifth threshold and strictly less than the sixth threshold;
  by rounding the floating value of a pixel of the image to a value equal to the lesser whole number minus a deviation value O if the difference is greater than or equal to the fourth threshold and strictly less than the fifth threshold;
  by rounding the floating value of a pixel of the image to a value equal to the greater whole number plus a deviation value O if the difference is greater than the second threshold and less than or equal to the third threshold; and
  by rounding the floating value to the nearest whole number in other cases.

According to one embodiment, only the floating values of the pixels belonging to a part of the image are quantised.

According to a variant of this embodiment, the test value is the value of a pixel that belongs to a temporally or spatial-temporally filtered version of the test image.

According to another of its aspects, the invention relates to a method for predictive coding of an image block formed of floating values comprising a step for quantising the floating values of this image block, characterised in that the quantisation of the floating values of the pixels of this image block is determined according to a method compliant with one of the above quantisation methods.

The image block predictive coding method considers a non-quantised version of the image block and determines the quantisation to be used to quantise the floating values of the image block according to a calculated prediction error between the image block and a prediction block.

Thus, a prediction block is determined to predict a non-quantised version of the image block which allows a prediction error to be obtained that is not biased by the quantisation noise due to the rounding of the floating values of the pixels of the image block. The coding efficiency is increased.

According to one embodiment, the prediction block comes from an intra or inter prediction mode.

According to another of its aspects, the invention relates to a device for quantising a floating value of a pixel in an image by rounding to the whole number, to the greater whole number, or to the greatest whole number closest to this floating value, characterised in that the means configured to choose the rounding of this floating value is based on a test value.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

Figure 1:
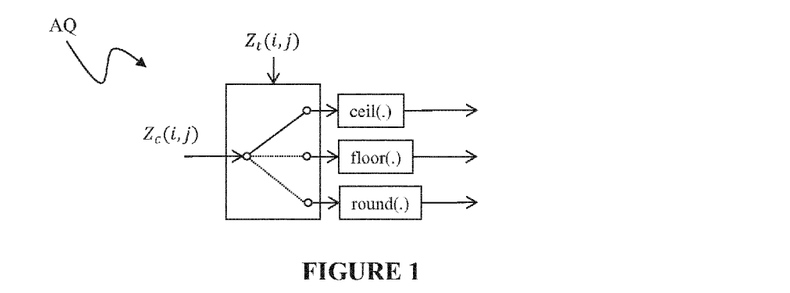
FIG. 1 diagrammatically illustrates the steps of a method of quantising a floating value of a pixel of an image.

FIG. 1 diagrammatically illustrates the steps of a method of quantising, referenced AQ, a floating value $Z_c(i,j)$ of a pixel (i,j) of an image.

The floating value $Z_c(i,j)$ is rounded either to the greater whole number according to a function marked ceil( ), to the lesser whole number according to a function marked floor( ), or to the nearest whole number according to a function marked round( ).

Represented symbolically by a switch on FIG. 1, the selection of rounding this floating value is determined based on a test value $Z_t(i,j)$.

According to one embodiment, the rounding selection for this floating value is determined by comparing this floating value and this test value.

According to one embodiment, the test value $Z_t(i,j)$ is the value of a pixel that belongs to an image, called a test, other than the image to which the floating value to be quantised belongs.

For example, this test image and the image to which the pixel to the quantised belongs belong to consecutive images in a single image sequence.

According to one embodiment, a pixel (i,j) of the test image is determined from a displacement information element (di, dj) of the pixel from the image. This displacement information is defined relative to a particular reference such as, for example, the pixel whose floating value is quantised.

According to one embodiment, only the floating values of the pixels belonging to a portion of an image are quantised according to the quantisation method described in relation to FIG. 1.

This image portion may be an image block, a macroblock, a coding unit under the HEVC (High Efficiency Video Coding) standard or even an image area obtained by a segmentation method.

Figure 2:
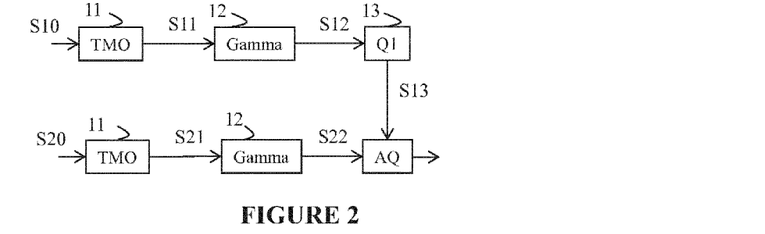
FIG. 2 diagrammatically illustrates the steps of an embodiment of the method of quantising a floating value of a pixel of an image.

According to an embodiment illustrated in FIG. 2, the image whose floating values must be quantised is image S22. This image S22 is a version of an image S20 of an original image sequence. The luminance component of this version S22 has a reduced dynamic range compared to that of the luminance component of the image S20.

Also, according to one embodiment, a test image S13 is considered. This test image S13 is a quantised version of an image S12, and the image S12 is a version of an image S10 of this original image sequence. The image S12 has a luminance component whose dynamic range was also reduced compared to that of the image S10. It may be noted that the image S13 groups the pixels whose values are whole values.

Generally, reducing the dynamic range of the luminance component of an original image amounts to applying a TMO operator (Tone Mapping Operators or Tone Reproducers). This original image may be, for example, acquired by a high dynamic range camera, and applying a TMO operator then makes it possible to obtain an image whose luminance component has a low dynamic range so as to adjust the dynamic range of the luminance component of the original image to that, for example, of a screen on which this image is displayed.

Hereafter, reducing the dynamic range of an image is equivalent to reducing the luminance component (values) of this image.

If once its dynamic range is reduced the original image is intended for a display system, the luminance component of this adapted image is quantised and encoded so as to be compatible with a display standard (BT 709, etc.). In this case, we usually refer to luma components rather than luminance components. The luminance, for its part, corresponds to a physical unit expressed in $cd/m^2$.

The invention is equally applicable to a luminance component and a luma component.

The test image S13 is obtained by steps 11, 12, and 13 of FIG. 2.

During step 11, a TMO operator is applied to the image S10.

There are several types of TMO operators, and the invention is not limited to a particular TMO operator.

For example, this TMO operator is that developed by Reinhard which is commonly called a PTR operator (Reinhard, E., Stark, M., Shirley, P., and Ferwerda, J., "*Photographic tone reproduction for digital images,*" *ACM Transactions on Graphics* 21 (July 2002)).

The principle of this TMO operator is to reduce a luminance component $L_w$ of an original image so as to obtain a reduced luminance component $L_d$ of the image by using a sigmoid mapping curve given by equation (2):

$$L_d = \frac{L_s}{1+L_s} \cdot \left(1 + \frac{L_s}{L_{white}^2}\right) \tag{2}$$

where $L_{white}$ is a luminance value used to reduce zones with high luminance values, $L_d$ is a matrix whose size is that of the image and which comprises the luminance values of the pixels of the image which are expressed in a lower dynamic value range than that of the original image and $L_s$ is a matrix whose size is that of the image and which comprises the luminance values obtained by equation (3):

$$L_s = \frac{a}{k} \cdot L_w \tag{3}$$

where a is a chosen exposure value, and k, commonly called a key, defines an indication of the brightness of the image given by equation (4):

$$k = \exp\left(\frac{1}{N} \cdot \sum_{i=1}^{N} \log(\delta + L_w(i))\right) \tag{4}$$

where N is the number of pixels in the image, $\delta$ is a value which avoids any singularity and $L_w(i)$ is the luminance value of a pixel i of the luminance component $L_w$ of the image.

The values a and $L_{white}$ are two parameters of this TMO which are fixed, for example, at 18% for parameter a and at the maximum luminance value of the original image for parameter $L_{white}$. Equation (2) can be reformulated ignoring the factor used to reduce zones with high luminance values:

$$L_d = \frac{L_s}{1+L_s} \tag{5}$$

A TMO operator can also be used, which reduces the dynamic range of each image of an image sequence independently of the dynamic range of the other images of this image sequence and to choose, for each conversion of an image, a key according to the pixels of this image and the pixels of a predetermined number of images which temporally precede the image to be converted in the image sequence (Kang, S. B., Uyttendaele, M., Winder, S., and Szeliski, R., "*High dynamic range video,*" in [*ACM SIGGRAPH* 2003 *Papers on—SIGGRAPH '03*], 319, ACM Press, New York, N.Y., USA (2003)).

More specifically, the key is calculated from equation (4) wherein N is equal to the sum of the number of pixels in the image to be processed and the number of pixels in the images which temporally precede it in the image sequence.

A TMO operator can also be used, which uses a number of preceding images which is dynamically adapted according to the key of the current image and those of the preceding images (Ramsey, S., III, J. J., and Hansen, C., "*Adaptive temporal tone mapping,*" *Computer Graphics and Imaging*—2004 (3), 3-7 (2004)).

A TMO operator can also be used, which compares an original image using a visual response of the humans visual system (HVS) with an image whose luminance values belong to a dynamic range adapted to a screen (Mantiuk, R., Daly, S., and Kerofsky, L., "*Display adaptive tone mapping*" *ACM Transactions on Graphics* 27, 1 (August 2008)) which makes it possible to obtain an image whose visual perception on this screen is as little distorted as possible. A minimisation of a residual error between the results of the responses of the human visual system is calculated during these methods. This minimisation results in a conversion curve which is piece-wise linear and calculated image by image.

Processing can also be applied to an image sequence resulting from the application of a TMO operator, previously mentioned, to each image of an original sequence, in order to preserve the temporal coherence of the brightness between the images of the original image sequence.

For example, Boitard et al. (R. Boitard et al., "*Temporal coherency for video tone mapping,*" in Proc. SPIE 8499, Applications of Digital Image Processing XXXV, 2012.) propose that the dynamic range of the values of the luminance component Ld of an image of an original image sequence modified by one of the TMO operators previously mentioned is reduced by a value calculated from a global characteristic of the original image sequence.

The reduced dynamic range luminance component $L'_d$ is then given by equation (6):

$$L'_d = R \cdot L_d \quad (6)$$

According to a variant, the reduced dynamic range luminance component L'd is the given by equation (7):

$$L'_d = (x + (1-x) \cdot R) L_d \quad (7)$$

where x is an offset in the reduction value fixed for example by a user.

In the particular case where the TMO operator is a PTR operator, the value R is given by equation (8):

$$R = \frac{k_p}{k_p + k_v} \quad (8)$$

This latter embodiment makes it possible to preserve the perception of an object present in the original image sequence and to ensure the temporal coherence of the brightness between the images of the original image sequence.

Preferably, the value R is given by equation (9):

$$\frac{k_i^{HDR} \cdot k_{i,max}^{LDR}}{k_{i,max}^{HDR} \cdot k_i^{LDR}} \quad (9)$$

where $k_i^{HDR}$ is the key of the luminance component of the image to be processed of the original image sequence, $k_{i,max}^{HDR}$ is the maximum key from among the keys of the luminance components of the original image sequence, $k_i^{LDR}$ is the key of the modified luminance component Ld of the image to be processed and $k_{i,max}^{LDR}$ is the maximum key from among the keys of the modified luminance components Ld originating from the original image sequence.

During step 12, a Gamma correction is normally applied on the image S11 that results from the application of an operator TMO and whose luminance component is expressed as a floating value generally in the interval [0;1].

During step 13, the image S12 is scaled and quantised by rounding the floating value of each pixel to the nearest whole number. The final image is called S13. This image S13 comprises the whole values for the pixels that are normally expressed over 8 bits (between 0 and 255).

The image S22 is obtained from steps 11 and 12.

According to one embodiment, the floating value of the pixel of the image is converted to extend within the range of compatible values with that of the values of the pixels of the test image S13.

For example, if the floating values of the pixels of the image 22 range from 0 to 1, the floating value of each pixel of the image 22 is converted to within a range of values compatible with that of the test image S13, generally defined between 0 and 255 (8 bits).

According to one embodiment, the rounding selection for the floating value is determined from the difference between this floating value and the test value.

According to one embodiment, the quantisation is determined by rounding the floating value of a pixel of the image S22 to the greater whole value if the difference is less than or equal to a threshold, and otherwise to the lesser whole number.

According to a variant of this embodiment, the threshold is equal to the null value.

In mathematical terms, the floating value $Z_c(i,j)$ of the pixel is quantised according to the following equations:

$$Z_c(i,j) = \begin{cases} \text{ceil}(Z_c(i,j)) & si \ Z_c(i,j) - Z_t(i+d_i, j+d_j) \leq 0 \\ \text{floor}(Z_c(i,j)) & si \ Z_c(i,j) - Z_t(i+d_j, j+d_j) > 0 \end{cases} \quad (10)$$

with $(d_i, d_j)$ information defining the displacement of the pixel in the image.

According to one embodiment, the quantisation is determined by rounding the floating value of a pixel from the image S22 to the greater whole number if the difference is less than 0 but greater than a negative threshold, to the lesser whole value if the difference is greater than 0 but less than a positive threshold, and rounding the floating value of the pixel to the nearest whole number if the floating value is less than or equal to the negative threshold and greater than or equal to the positive threshold.

In mathematical terms, the floating value $Z_c(i,j)$ of the pixel is quantised according to the following equations:

$$Z_c(i,j) = \begin{cases} \text{ceil}(Z_c(i,j)) & si \ -\alpha < Z_c(i,j) - Z_t(i+d_i, j+d_j) \leq 0 \\ \text{floor}(Z_c(i,j)) & si \ 0 < Z_c(i,j) - Z_t(i+d_j, j+d_j) < \alpha \\ \text{round}(Z_c(i,j)) & sinon \end{cases} \quad (11)$$

with $(d_i, d_j)$ information defining the displacement of the pixel in the image and $\alpha$ a whole value threshold.

Figure 3:
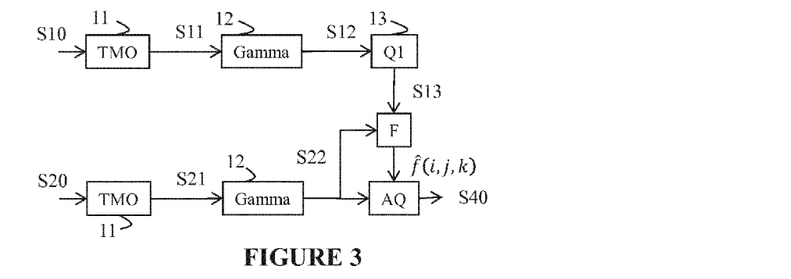
FIG. 3 diagrammatically illustrates the steps of a variant of the embodiment described in relation to FIG. 2.

According to a variant of this embodiment illustrated in FIG. 3, the test value $Z_t(i,j)$ is the value $\hat{f}(i,j,k)$ of a pixel (i,j) that belongs to a temporally and spatial-temporally filtered version of the test image S13 (referenced image k in the following formulas).

Temporally filtering an image reduces the image's noise (denoising), thereby improving the subjective quality of the image sequence to which the image belongs, as well as the efficiency of any processing carried out after the denoising (coding, monitoring, etc.).

Temporally filtering the successive images of an image sequence (T. S. Huang, Ed., *Image Sequence Analysis*. Berlin: Springer-Verlag, 1981) amounts to using a filter 1D, that is to say calculating a test value relative to a pixel (i,j) of the image k (here by image S13) according to the following equation:

$$\hat{f}(i,j,k) = \Sigma_{l=-O}^{M} w(l) g(i,j,k-l) \quad (12)$$

in which M means the causal extension, O means the non-causal extension of a temporal window, g(i,j,k) is the value of the pixel (i,j) of the image k, and w(l) is the weight or filter coefficients.

This filtering method implies that the signal is temporarily stationary. However, this is not often the case. To avoid this limitation, a motion compensation is used to make the signal more temporally stationary. The test value related to a pixel (i,j) of the image k is then obtained by:

$$\hat{f}(i,j,k) = \Sigma_{l=-N}^{M} w(l) g(i - \hat{d}_x^{k,k-l}(i-p,j-q), j - \hat{d}_y^{k,k-l}(i-p,j-q), k-l) \quad (13)$$

in which $\hat{d}_x^{k,k-l}$ and $\hat{d}_y^{k,k-l}$ are the horizontal and vertical components of an estimated motion between images k and k–l.

According to a variant, the filter 1D can be extended to the spatial domain and thus obtain a spatio-temporal domain 3D (Ozkan, M. K.; Erdem, A. T.; Sezan, M. I.; Tekalp, A. M., "*Efficient multiframe Wiener restoration of blurred and noisy image sequences,*" Image Processing, IEEE Transactions on, vol. 1, no. 4, pp. 453,476, October 1992). A test value related to a pixel (i,j) in image k is then obtained by:

$$\hat{f}(i,j,k) = \Sigma_{p,q,l \in S} w(p,q,l) g(i-p, j-q, k-l) \quad (14)$$

in which S means a spatio-temporal support for the filter 3D, w(p,q,l) means the filter coefficient (i.e., the weight indicating the relative importance of each element contained in the support S of the filter), and the triplet (p,q,l) means the coordinates in the support S.

A variant of this filter 3D consists of adjusting the filter so as to assign a stronger weight if the pixels belong to the same object (C. B. Dekker, A. J. E. M. Janssen, and P. J. van Otterloo, "*The contour plot method for noise reduction in digital video,*" Acta Electronica, vol. 27, no. 1-2, pp. 119-131, 1985).

According to one embodiment, the quantisation is determined from a first, second, third, fourth, fifth, and sixth thresholds whose values are increasing, the first, second, and third thresholds being negative values and the fourth, fifth, and sixth thresholds being positive values:

by rounding the floating value of a pixel of the image S22 to the greater whole number:
if the difference is strictly greater than the first threshold and less than or equal to the second threshold; or
if the difference is negative or equal to 0 and strictly greater than the third threshold;

by rounding the floating value of a pixel of the image S22 to the lesser whole number:
if the difference is strictly positive and strictly less than the fourth threshold; or
if the difference is greater than or equal to 0 or equal to the fifth threshold and strictly less than the sixth threshold;

by rounding the floating value of a pixel of the image S22 to a value equal to the lesser whole number minus a deviation value O if the difference is greater than or equal to the fourth threshold and strictly less than the fifth threshold;

by rounding the floating value of a pixel of the image S22 to a value equal to the greater whole number plus a deviation value O if the difference is greater than the second threshold and less than or equal to the third threshold; and by rounding the floating value to the nearest whole number in other cases.

In mathematical terms, the determination of the quantisation is then expressed by:

$$Z_c(i,j) = \begin{cases} \text{ceil}(Z_c(i,j)) & \text{si } T_1 < Z_c(i,j) - Z_t(i+d_i, j+d_j) \leq T_2 \\ \text{ceil}(Z_c(i,j)+O) & \text{si } T_2 < Z_c(i,j) - Z_t(i+d_i, j+d_j) \leq T_3 \\ \text{ceil}(Z_c(i,j)) & \text{si } T_3 < Z_c(i,j) - Z_t(i+d_i, j+d_j) \leq 0 \\ \text{floor}(Z_c(i,j)) & \text{si } 0 < Z_c(i,j) - Z_t(i+d_j, j+d_j) < T_4 \\ \text{floor}(Z_c(i,j)-O) & \text{si } T_4 \leq Z_c(i,j) - Z_t(i+d_j, j+d_j) < T_5 \\ \text{floor}(Z_c(i,j)) & \text{si } T_5 \leq Z_c(i,j) - Z_t(i+d_i, j+d_j) < T_6 \\ \text{round}(Z_c(i,j)) & \text{otherwise} \end{cases}$$

where $T_1 < T_2 < T_3 < T_4 < T_5 < T_6$ are the positive threshold values.

For example, the absolute values of T1 and T6 are equal, T2 and T5 are equal, and T3 and T4 are also equal.

Figure 4:
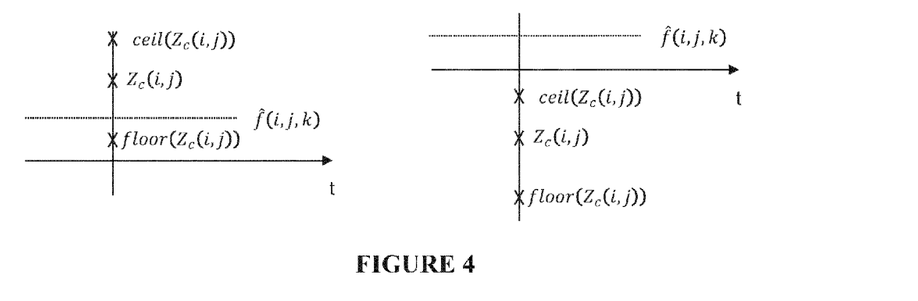
FIG. 4 shows diagrams that illustrate how, for example, the rounding of a floating value is chosen from a test value $\hat{f}(i,j,k)$.

FIG. 4 shows diagrams that illustrate how, for example, the rounding of a floating value is chosen from a test value $\hat{f}(i,j,k)$.

On the left side, the test value $\hat{f}(i,j,k)$ is positive (dotted line). The floating value $Z_c(i,j)$, which itself is positive, may be rounded either to the greater whole number (ceil(·)) or to the lesser whole number (floor(·)). Here, the rounding is chosen by comparing the whole number that is greater than the floating value ceil($Z_c(i,j)$) with the test value $\hat{f}(i,j,k)$ and the whole number less than the floating value floor($Z_c(i,j)$) with the test value $\hat{f}(i,j,k)$. The selected rounding is then whichever one minimises the difference between these values. Namely, the rounding to the lesser whole number is chosen here because the absolute difference between the test value $\hat{f}(i,j,k)$ and floor($Z_c(i,j)$) is less than the difference between the test value $\hat{f}(i,j,k)$ and ceil($Z_c(i,j)$).

On the right side, the test value $\hat{f}(i,j,k)$ is positive. The floating value $Z_c(i,j)$ is negative this time and can be rounded either to the greater whole number (ceil(·)) or to the lesser whole number (floor(.)). Here, the rounding is chosen by comparing the whole number that is greater than the floating value ceil($Z_c(i,j)$) with the test value $\hat{f}(i,j,k)$ and the whole number less than the floating value floor($Z_c(i,j)$) with the test value $\hat{f}(i,j,k)$. The selected rounding is whichever one minimises the absolute difference between these values. Namely, the rounding to the greater whole number is chosen here because the difference between the test value $\hat{f}(i,j,k)$ and ceil($Z_c(i,j)$) is less than the difference between the test value $\hat{f}(i,j,k)$ and floor($Z_c(i,j)$).

The invention is not limited to these examples for selecting the rounding of a floating value, but rather it extends to any approach in which the selection of the rounding of a floating value is determined based on the test value.

The method for quantising a floating value can be used in multiple applications, including in a method of coding an image block of floating values.

Generally, the predictive coding of an image block of floating values consists of encoding a residual error block $B_{res}$ calculated between the image block to be coded B, and a prediction block $B_{pred}$. The residual error block $B_{res}$ is then transformed by a transformed T, for example, by DCT (Discrete Cosinus Transform). The coefficients resulting from this transformation of the residual error block are then then quantised according to a method marked Q, and the quantised coefficients are normally coded by an entropic coding method. It may be noted that this quantisation method Q is different than the quantisation implemented by the module AQ, as explained below.

It is also normal for this type of coding method to include at least one so-called intra prediction mode and/or at least one so-called inter prediction mode.

If multiple prediction modes (intra and/or inter) are available, the coding method comprises a prediction mode decision module that consists of choosing the available prediction mode that best corresponds to the coding cost and the degradation of the image block once coded/decoded.

An intra prediction mode consists of predicting the image block 13, from the information from the image to which this image block to predict belongs. This is shown diagrammatically in FIG. 5 by the "Intra/AQ" module, which receives an image block as input, obtained by adding a coded/decoded residual error block and a prediction block. If there are multiple intra prediction modes available, one prediction block per prediction mode is sent from the "Intra/AQ" module in FIG. 5 to the "Prediction Mode Decision" module.

An inter prediction mode consists of predicting the image block $B_c$ from the information from the one (or more) images to which this image block to predict belongs. This is shown diagrammatically in FIG. 5 by the "Inter/QA" module, which receives information from a so-called reference image (or multiple images) as input. If there are multiple inter prediction modes available, a prediction block and associated motion information is sent by the prediction mode of the "Inter/AQ" module in FIG. 5 to the "Prediction Mode Decision" module.

A bitrate/distortion criterion, commonly known as Rdo (Rate distortion optimisation) and well known in the field of video compression, is normally used to evaluate the balance between the coding cost and the degradation of the image block once coded/decoded.

In mathematical terms, an Rdo criterion is expressed by:

$$Cst = Dist_{dec} + \lambda_{LDR} \cdot B_{cost} \quad (15)$$

where $$Dist_{dec} = \sum_{i=0}^{N-1} \sum_{j=0}^{M-1} (b_c(i, j) - b_r(i, j))^2 \quad (16)$$

$$B_{cost} = B_{res}^{cst} + Header_{cost}$$

In these equations, $B_{cos\ t}$ means the total coding cost, $B_{res}^{cst}$ means a coding cost for the transformed coefficients quantised by entropic coding, and $Header_{cos\ t}$ means the coding cost of syntax elements (for example, prediction mode index, motion vectors used to reconstruct the image block).

In these equations, $Dist_{dec}$ means a reconstruction error between the image block $B_c$ and this reconstructed image block $B_r$. More precisely, the reconstructed image block $B_r$ comes from the sum of the prediction block $B_{pred}$ and the reconstructed residual error block, that is to say from the quantisation and reverse transform applied to the transformed and quantised coefficients. It can be noted that the reconstruction error comes from the average quadratic error, but that the invention is in no way limited to this example metric.

In these equations, $\lambda_{LDR}$ means a parameter value, called Lagrangien, which is adjusted so as to have the best bitrate/distortion balance.

The minimisation of the Rdo Cst criterion is then expressed by:

$$J_{mode} = \underset{j}{\operatorname{argmin}}\{Cst_j\} \quad (17)$$

in which the choice of the best prediction mode, index $J_{mode}$, is obtained by selecting the one that gives rise to the overall minimum cost Cst of all available prediction modes.

Such a coding method can be used to code an image sequence with high dynamic range, typically greater than 8 bits. However, the dynamic range of the luminance component of this image sequence should first be reduced using steps 11 and 12, described in reference to FIG. 2.

Figure 5:
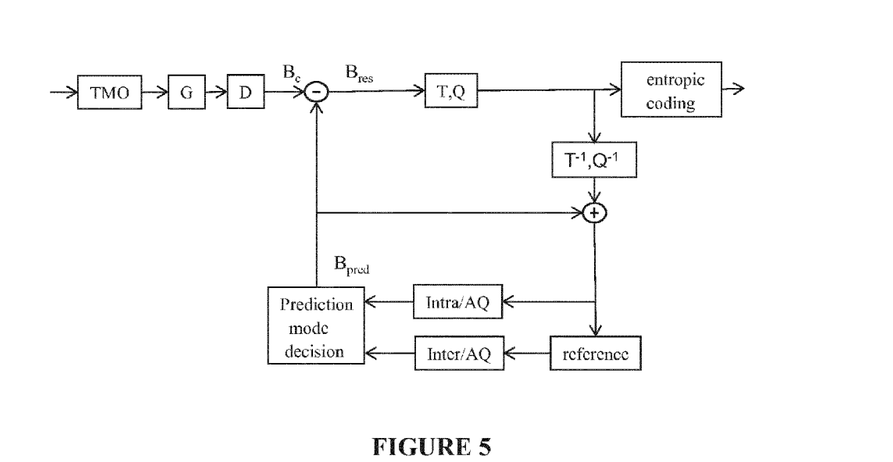
FIG. 5 diagrammatically shows a functional diagram of an image block predictive coding method formed of floating values.

The image block 13, then includes floating values because this block is a reduced dynamic range image block (possibly gamma corrected) but not quantised.

According to one embodiment, the floating values of the image block $B_c$, which normally range between 0 and 1, are converted to include the range of values compatible with that of the prediction block $B_{pred}$, generally between 0 and 255 (8 bits). That's the function served by module "D".

The "Intra/AQ" and "Inter/AQ" modules determine the quantisation used to quantise the floating values of the image block $B_c$ according to a method described in reference to FIG. 1-4.

Figure 6:
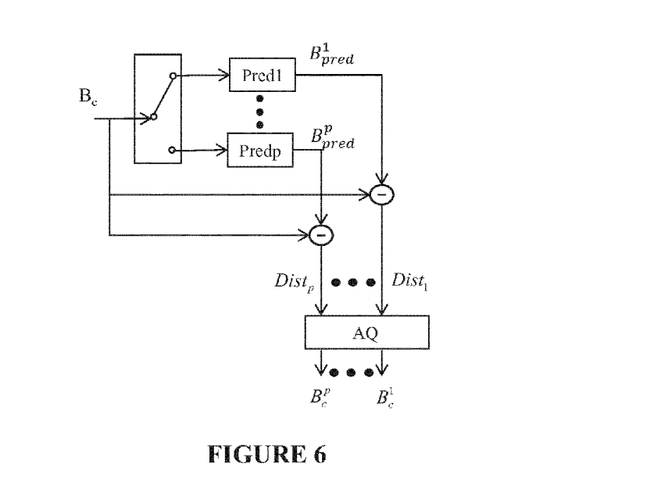
FIG. 6 shows an embodiment of the "Intra/AQ" module to determine the quantisation of the floating values of the image block when the image block is predicted by an intra prediction mode.

FIG. 6 shows an embodiment of the "Intra/AQ" module to determine the quantisation of the floating values of the image block $B_c$ when the image block is predicted by an intra prediction mode.

For each available intra prediction mode p, a prediction block $B_{pred}^p$ is obtained by prediction of the image block $B_c$ according to the considered intra prediction mode p.

A prediction error is then calculated between the image block $B_c$ and the prediction block $B_{pred}^p$ according to, for example, an average quadratic error type distance:

$$Dist_p = \sum_{i=0}^{N-1} \sum_{j=0}^{M-1} (B_c(i, j) - B_{pred}^p(i, j))^2 \quad (18)$$

in which $B_{pred}^p$ (i,j) is the test value.

The invention is not limited to any one metric to calculate the prediction error.

The "Intra/AQ" module also comprises an "AQ" module that quantises the floating values of the image block $B_c$ according to a quantisation determined according to the prediction error $Dist_p$.

The "Intra/AQ" module then provides a quantised image block, that is to say an image block whose floating values were thus quantised, and the associated prediction block or, if there are multiple intra prediction modes, the quantised image block $B_c^p$ and its associated prediction block $B_{pred}^p$ for each prediction mode p.

The optimal prediction mode is then determined as explained in relation to the equation (10). It can be noted that the image block $B_c$ of the equation (11) is replaced by the quantised image block $B_c^p$.

According to one embodiment, the quantisation is determined by rounding the floating value of a pixel of the image block $B_c$ to the greater whole value if the prediction error is less than or equal to a threshold, and otherwise to the lesser whole number.

According to a variant of this embodiment, the threshold is equal to the null value.

In mathematical terms, the determination of the quantisation is then expressed by:

$$B_c^p(i, j) = \begin{cases} \text{ceil}(B_c(i, j)) & si\ B_c(i, j) - B_{pred}^p(i, j) \leq 0 \\ \text{floor}(B_c(i, j)) & si\ B_c(i, j) - B_{pred}^p(i, j) > 0 \end{cases} \quad (19)$$

According to one embodiment, the quantisation is determined by rounding the floating value of a pixel from the image block $B_c$ to the greater whole number if the difference is less than 0 but greater than a negative threshold, to the lesser whole value if the difference is greater than 0 but less than a positive threshold, and rounding the floating value of the pixel to the nearest whole number if the floating value is less than or equal to the negative threshold and greater than or equal to the positive threshold.

In mathematical terms, the adaptation of the quantisation is then expressed by:

$$B_c^p(i, j) = \begin{cases} \text{ceil}(B_c(i, j)) & si\ -\alpha < B_c(i, j) - B_{pred}^p(i, j) \leq 0 \\ \text{floor}(B_c(i, j)) & si\ 0 < B_c(i, j) - B_{pred}^p(i, j) < \alpha \\ \text{round}(B_c(i, j)) & sinon \end{cases} \quad (20)$$

Figure 7:
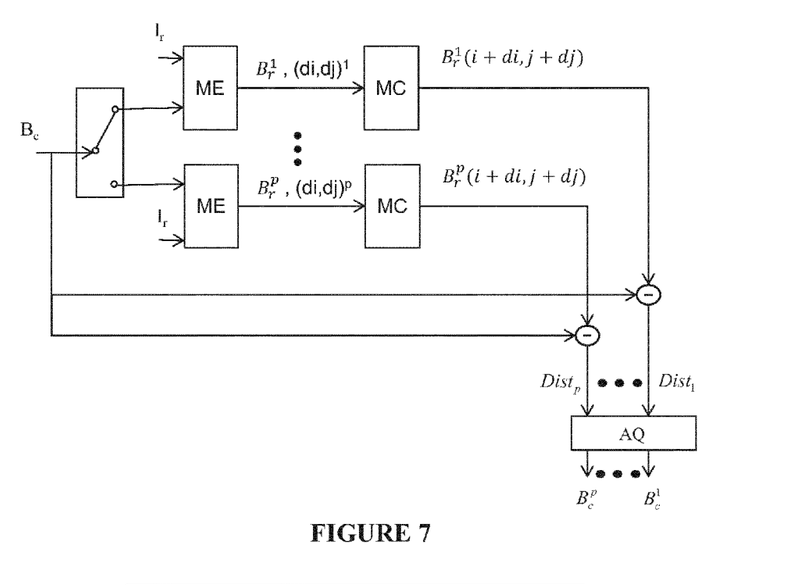
FIG. 7 shows an embodiment of the "Inter/AQ" module to determine the quantisation of the floating values of the image block when the image block is predicted by an inter prediction mode.

FIG. 7 shows an embodiment of the "Inter/AQ" module to determine the quantisation of the floating values of the image block $B_c$ when the image block is predicted by an inter prediction mode.

For each available inter prediction mode p, a prediction block $B_r^p$ is obtained by prediction of the image block $B_c$ according to the considered inter prediction mode p.

The prediction block $B_r^p$ is determined here from a reference image (or multiple images) $I_r$ according to a method of estimating motion ("ME" module), such as block matching. The reference image is an image in the image sequence whose dynamic range was reduced (possibly gamma corrected) and quantised.

For clarity, only cases with a single reference image is detailed here. However, the extension to cases with motion estimated using multiple reference images, which is a widely known example to those skilled in the art, are not outside the scope of the invention.

A movement vector $(di,dj)_p$ that defines the displacement of the prediction block $B_r^p$ from the reference image to the image block $B_c$, is then issued from the "ME" module.

The prediction block $B_r^p$ is then compensated (displaced) according to the motion vector $(di,dj)_p$ ("MC" module), and a prediction error $Dist_p$ is calculated between this displaced prediction block $B_r^p$ and the image block $B_c$.

This prediction error is calculated, for example, by:

$$Dist_p = \sum_{i=0}^{N-1} \sum_{j=0}^{M-1} (B_c(i, j) - B_r^p(i+di, j+dj))^2 \quad (21)$$

The invention is not limited to any one metric to calculate the prediction error.

The "Inter/AQ" module also comprises an "AQ" module that quantises the floating values of the image block $B_c$ according to a quantisation determined according to the prediction error $Dist_p$.

The "Inter/AQ" module then provides a quantised image block, that is to say an image block whose floating values were thus quantised, and the prediction block and the associated motion vector or, if there are multiple inter prediction modes, the quantised image block $B_c^p$ and its prediction block $B_r^p$ and its motion vector $(di,dj)_p$ for each prediction mode p.

The optimal prediction mode is then determined as explained in relation to the equation (10). It can be noted that the image block $B_c$ of the equation (11) is replaced by the quantised image block $B_c^p$.

According to one embodiment, the quantisation is determined by rounding the floating value of a pixel of the image block $B_c$ to the greater whole value if the prediction error is less than or equal to a threshold, and otherwise to the lesser whole number.

According to a variant of this embodiment, the threshold is equal to the null value.

In mathematical terms, the determination of the quantisation is then expressed by:

$$B_c^p(i, j) = \begin{cases} \text{ceil}(B_c(i, j)) & si\ B_c(i, j) - B_r^p(i+di, j+dj) \leq 0 \\ \text{floor}(B_c(i, j)) & si\ B_c(i, j) - B_r^p(i+di, j+dj) > 0 \end{cases} \quad (22)$$

According to one embodiment, the quantisation is determined by rounding the floating value of a pixel from the image block $B_c$ to the greater whole number if the difference is less than 0 but greater than a negative threshold, to the lesser whole value if the difference is greater than 0 but less than a positive threshold, and rounding the floating value of the pixel to the nearest whole number if the floating value is less than or equal to the negative threshold and greater than or equal to the positive threshold.

In mathematical terms, the adaptation of the quantisation is then expressed by:

$$B_c^p(i, j) = \begin{cases} \text{ceil}(B_c(i, j)) & si\ -\alpha < B_c(i, j) - B_r^p(i+di, j+dj) \leq 0 \\ \text{floor}(B_c(i, j)) & si\ 0 < B_c(i, j) - B_r^p(i+di, j+dj) < \alpha \\ \text{round}(B_c(i, j)) & sinon \end{cases} \quad (23)$$

It can be noted that the reference image Ir used for each inter prediction mode is not necessarily the same. Some inter prediction modes can also use a different number of reference images.

Furthermore, the motion estimation and/or compensation methods may differ from one inter prediction mode to another.

Also, if at least one intra prediction mode and at least one inter prediction mode, the two embodiments described with reference to FIGS. 6 and 7 are combined.

In FIGS. 1 to 7, the modules shown are functional units that may or may not correspond to physically distinguishable units. For example, these modules or some of them can be grouped together in a single component or circuit, or constitute functions of the same software. On the contrary, some modules may be composed of separate physical entities. The devices and systems compatible with the invention are implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

Figure 8:
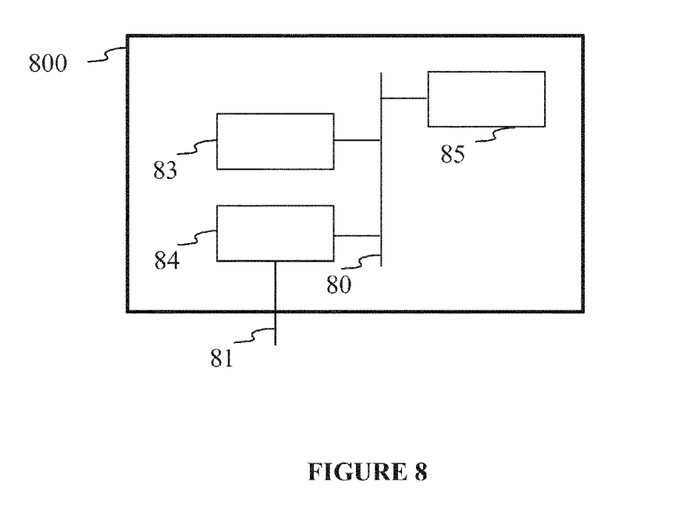
FIG. 8 shows a functional diagram of a device for quantising a floating value of a pixel of an image.

According to one of its hardware aspects, the invention relates to a device 800 for the predictive coding of an image block formed by floating values described with reference to FIG. 8.

Device 800 comprises the following elements, interconnected by a digital address and data bus 80:
- A calculation unit 83 (also called a central processing unit);
- A memory 85;
- A network interface 84, for interconnections between device 800 and other remote devices connected via a connection 81;

The calculation unit 83 can be implemented by a (possibly dedicated) microprocessor, a (possibly also dedicated) microcontroller, etc. The memory 85 can be implemented in a volatile and/or non-volatile form such as a RAM (random access memory), a hard disc, an EPROM (erasable programmable ROM), etc. Device 800 is configured, that is to say that the means 83, 84 and possibly 85 cooperate with one another to implement a method according to the invention described in relation to FIGS. 1 to 7.

Thus, these means are configured to quantise a floating value of a pixel in an image by rounding to the whole number, to the greater whole number, or to the greatest whole number closest to this floating value, the selection of rounding this floating value being determined based on a test value.

The invention claimed is:

1. A method for quantizing floating point values of pixels of an image of an image sequence, characterized in that the method comprises:
    obtaining a first image from said image of the image sequence by reducing the dynamic range of said image;
    obtaining a test image from a second image of the image sequence, distinct of the image to-be-quantized, by:
        obtaining a third image from said second image by reducing the dynamic range of said second image; and
        obtaining said test image from said third image by quantizing the floating point values of said third image;
    quantizing the floating point value of at least one pixel of said image by selecting a rounding of said floating point value to either the greater whole number, the lesser whole number, or the nearest whole number according to the floating point value of a pixel of said test image.

2. The method of claim 1, in which selecting the rounding for the floating value of a pixel of said image is determined by comparing this floating value and the floating point value of a pixel of said test image.

3. The method of claim 1, in which the pixel of the test image is determined from a displacement information element of the pixel from said image.

4. The method of claim 3, in which the floating value of the pixel of said image is converted to extend within the range of compatible values with that of the floating point values of the pixels of the test image.

5. The method of claim 1, in which selecting the rounding for the floating value of a pixel of said image is determined from the difference between this floating value and the floating point value of a pixel of said test image.

6. The method of claim 5, in which the floating value of a pixel of said image is rounded by the greater whole value if the difference is less than or equal to a threshold, and otherwise to the lesser whole number.

7. The method of claim 5, in which the floating value of a pixel of said image (S20) is rounded by the greater whole number if the difference is less than 0 but greater than a negative threshold, to the lesser whole value if the difference is greater than 0 but less than a positive threshold, and to the nearest whole number if the floating value is less than or equal to the negative threshold and greater than or equal to the positive threshold.

8. The method of claim 5, in which selecting the rounding uses a first, second, third, fourth, fifth, and sixth thresholds whose values are increasing, the first, second, and third thresholds being negative values and the fourth, fifth, and sixth thresholds being positive values, wherein selecting the rounding comprises:
    rounding the floating value of a pixel of said image is rounded by the greater whole number:
        if the difference is strictly greater than the first threshold and less than or equal to the second threshold; or
        if the difference is negative or equal to 0 and strictly greater than the third threshold;
    rounding the floating value of a pixel of said image is rounded by the lesser whole number:
        if the difference is strictly positive and strictly less than the fourth threshold; or
        if the difference is greater than or equal to 0 or equal to the fifth threshold and strictly less than the sixth threshold;
    rounding the floating value of a pixel of said image is rounded by a value equal to the lesser whole number minus a deviation value O if the difference is greater than or equal to the fourth threshold and strictly less than the fifth threshold;
    rounding the floating value of a pixel of said image is rounded by a value equal to the greater whole number plus a deviation value O if the difference is greater than the second threshold and less than or equal to the third threshold; and
    rounding the floating value of a pixel of said image is rounded by the nearest whole number in other cases.

9. The method of claim 1, wherein only the floating values of the pixels belonging to a part of said image are quantized.

10. The method of claim 1, wherein obtaining the test image further comprises temporally or spatio-temporally filtering the test image, and the rounding a floating point value of at least one pixel of said image is selected according to the floating point value of a pixel of a temporally or spatio-temporally filtered version of the test image.

11. The method for predictive coding of an image block formed of floating point values comprising quantizing the floating point values of this image block, characterized in that said quantizing of the floating point values of the pixels of this image block is compliant with claim 1.

12. The method of claim 11, in which a prediction block is determined to predict the non-quantized version of the image block from an intra or inter prediction mode.

13. A device for quantizing floating point values of pixels of an image of an image sequence, characterized in that the device comprises a processor configured to:
    obtain a first image from said image of the image sequence by reducing the dynamic range of said image;
    obtain a test image from a second image of the image sequence, distinct of the image to-be-quantized, by:

obtain a third image from said second image by reducing the dynamic range of said second image, and obtain said test image from said third image by quantizing the floating point values of said third image;

quantize the floating point value of at least one pixel of said image by selecting a rounding of said floating point value to either the greater whole number, the lesser whole number, or the nearest whole number according to the floating point value of a pixel of said test image.

* * * * *